United States Patent [19]

Tamburelli

[11] 4,283,788
[45] Aug. 11, 1981

[54] EQUALIZATION SYSTEM WITH PRESHAPING FILTER

[75] Inventor: Giovanni Tamburelli, Turin, Italy

[73] Assignee: CSELT - Centro Studi e Laboratori Telecomunicazioni S.p.A., Turin, Italy

[21] Appl. No.: 65,468

[22] Filed: Aug. 10, 1979

Related U.S. Application Data

[63] Continuation-in-part of Ser. No. 970,145, Dec. 18, 1978, abandoned, and Ser. No. 809,450, Jun. 23, 1977, Pat. No. 4,170,758.

[30] Foreign Application Priority Data

Jun. 25, 1976 [IT] Italy .............................. 68561 A/76
Sep. 30, 1976 [IT] Italy .............................. 69333 A/76
Feb. 25, 1977 [IT] Italy .............................. 67417 A/77
Dec. 21, 1977 [IT] Italy .............................. 69863 A/77
Mar. 9, 1978 [IT] Italy .............................. 67498 A/78

[51] Int. Cl.$^3$ ............................................. H04B 3/04
[52] U.S. Cl. ...................................... 375/14; 333/18; 364/724
[58] Field of Search ................... 375/12, 14, 18, 101; 333/18; 364/724, 825

[56] References Cited

U.S. PATENT DOCUMENTS

| | | | |
|---|---|---|---|
| 3,614,623 | 10/1971 | McAuliffe | 375/14 |
| 3,648,171 | 3/1972 | Hirsch | 375/14 |
| 3,696,203 | 10/1972 | Leonard | 375/14 |
| 3,798,576 | 3/1974 | Torpie et al. | 375/14 |
| 3,984,789 | 10/1976 | Luvison et al. | 375/14 |

OTHER PUBLICATIONS

Article by A. Desblache and J. Tarrieu, entitled "Fast Adaptive Equalizer for Maximum Likelihood Sequence Estimation", IBM Technical Disclosure Bulletin, vol. 20, No. 10, pub. Mar. 1978, pp. 3953-3956.

Article by G. David Forney, Jr., entitled "Maximum-Likelihood Sequence Estimation of Digital Sequences in the Presence of Intersymbol Interference", IEEE Transactions on Information Theory, vol. IT-18, No. 3, pub. May 1972, pp. 363-378.

Article by Gottfried Ungerboeck, entitled "Adaptive Maximum-Likelihood Receiver for Carrier-Modulated Data-Transmission Systems", IEEE Transactions on Communications, vol. COM-22, No. 5, pub. May 1974, pp. 624-636.

*Primary Examiner*—Benedict V. Safourek
*Attorney, Agent, or Firm*—Karl F. Ross

[57] ABSTRACT

An equalization system for eliminating precursor and postcursor interference effects from an incoming train of digital pulses comprises a cascade of decision stages interleaved with correction units emitting precursor-compensation signals to immediately following digital adders for algebraic combination with the incoming digital pulse train received thereby from a cascade of delay lines, the adders feeding the resulting precursor-compensated signals to respective decision stages. Postcursor compensation may be at least partially accomplished in a Viterbi or Ungerboeck receiver forming one of the decision stages or may be performed in an equalization cell having a correction unit transmitting postcursor-compensation signals to a digital adder inserted in the cascade of delay lines for substantially eliminating postcursor interference permanently. The cascade of decision stages may be preceded by a preshaping filter designed to reduce the amplitude of an incoming signal having a peak at an instant $t(0)$ to a near-zero value at an instant $t(0)+T$, where T is the recurrence period of the incoming digital pulse train.

16 Claims, 10 Drawing Figures

FIG. 3

EQUALIZATION SYSTEM WITH PRESHAPING FILTER

CROSS-REFERENCE TO RELATED APPLICATIONS

This is a continuation-in-part of my copending U.S. patent applications Ser. No. 809,450 filed June 23, 1977, now U.S. Pat. No. 4,170,758, and Ser. No. 970,145 filed December 18, 1978, now aban.

FIELD OF THE INVENTION

My present invention relates to digital transmission systems. In particular, my present invention relates to a method of and a device for the equalization of pulse trains at the receiving end of a digital transmission system.

BACKGROUND OF THE INVENTION

It is well known in the field of digital data transmission that signal degradation is mainly due to intersymbol interference arising from the non-ideal characteristics of the transmission channel. Each signal in a train of digital pulses is subjected to interference effects from the precursors (undershoots) of succeeding pulses and the postcursors (tails) of preceding pulses, these interference effects mounting with increasing transmission rate. Equalizers at the receiving end of a transmission channel frequently employ multiple transversal filters and cascaded feedback loops for eliminating postcursor-interference effects from an incoming train of digital pulses. Such equalizers entail undue complexity without facilitating substantial increases in the maximum possible transmission rates.

OBJECTS OF THE INVENTION

An object of my present invention is to provide an effective method of and simplified means for equalizing a train of incoming signals in the form of digital pulses.

A more particular object of my present invention is to provide a method of and means for equalizing digital pulse trains without the utilization of feedback loops.

SUMMARY OF THE INVENTION

An equalization system for eliminating the effects of postcursor and precursor interference from a train of incoming signals in the form of digital pulses comprises, according to my present invention, a timer, a pulse shaper, an equalizer and cascaded delay lines. The timer is connected to the receiving end of a transmission path carrying the incoming signals, which have a recurrence period T. This recurrence period is extracted from the incoming signals by the timer for establishing a succession of discrete intervals. The pulse shaper, at least particlly controlled by the timer, is connected to the transmission-path receiving end for deriving from the incoming signals a compensating wave whose absolute amplitude at instants $t_0 + T$ substantially equals that of the incoming signals, $t_0$ being the instants at which the digital pulses of the incoming train reach their peak amplitudes. The pulse shaper includes circuitry for subtractively combining the incoming signals with the compensating wave to produce a resulting pulse train with amplitudes close to zero at instants $t_0 + T$. The equalizer has a cascade of decision stages and interleaved algebraic adders connected to the pulse shaper for receiving the resulting pulse train therefrom; at least one of the decision stages is controlled by the timer to evaluate, at the discrete intervals established thereby, samples of the pulse train issuing from the pulse shaper. Each of the decision stages of the equalizer is followed by a respective corrective stage feeding an interference-compensating signal to the immediately following algebraic adder. The cascaded delay lines are connected between the pulse shapers and the algebraic adders for supplying the latter with samples of the pulse-shaped train at staggered periods corresponding to the operating times of the respective decision and corrective stages.

According to another feature of my present invention, the decision stages of the equalizer include at least one device for deciding entire pulse trains, a Viterbi receiver being such a device. The decision stages may also include at least one device for deciding individual pulses on the basis of an entire incoming pulse sequence, an Ungerboeck receiver being an example of such a device.

According to a further feature of my present invention, the decision stages of the equalizer include a conventional threshold decision unit and a filter feeding a corrective signal back from an output of the threshold unit to an input thereof. The threshold unit is advantageously an initial component in the decision-stage cascade, the filter feeding a postcursor-compensation signal to an adder inserted between the pulse shaper and the threshold unit.

According to yet another feature of my present invention, the pulse shaper includes a differentiating circuit for forming the compensating wave.

Pursuant to yet a further feature of my present invention, a method of equalizing a train of incoming digital signals to be sampled at successive instants separated by a predetermined period T, i.e. a method of eliminating in an equalizer the effects of precursor and postcursor interference from the train of incoming signals, comprises the steps of: (a) preshaping each incoming signal, having a peak value at instant $t(0)$, with reduction of its amplitude to a velue close to zero at instant $t(0) + T$; (b) transmitting the preshaped signal to a first decision stage of the equalizer; (c) deriving from the output of the first equalizer decision stage a feed-forward pulse adapted to compensate for precursor interference with a succeeding signal; (d) delaying the purged signal from step (b) by a time sufficient to let the delayed signal coincide with the feed-forward pulse derived in step (c); (e) algebraically combining the feed-forward pulse from step (c) with the delayed signal from step (b) to produce a resulting signal; and (f) transmitting the resulting signal from step (e) to a second decision stage of the eaualizer to produce a decided signal.

Pursuant to still another feature of my present invention, the method of equalizing a train of incoming digital signals further comprises the step of algebraically combining the preshaped signal of step (a), prior to transmission to the first decision stage of the equalizer, with a feedback pulse derived from the output of the first decision stage, thereby producing a corrected signal purged from postcursor interference due to a preceding signal. Step (a) may include the step of algebraically combining each incoming signal with a weighted derivative thereof.

An equalizer for eliminating the effects of precursor and postcursor interference from a train of incoming digital signals comprises, according to another aspect of my present invention, preshaping means connected to a transmission path carrying the incoming signals. A first threshold unit is connected to the preshaping means for converting a given incoming signal, sampled at uniform intervals, into a first decided pulse having one of several predetermined signal levels, a filter being connected to the threshold unit for deriving from the first decided pulse a feedback pulse adapted to correct postcursor interference and a feed-forward pulse adapted to compensate for precursor interference. A first adder inserted between the preshaping means and the first threshold unit is connected to the filter for algebraically combining the feedback pulse therefrom with a subsequent incoming signal, while a second adder is connected at an input to the filter for receiving therefrom the feed-forward pulse. A delay line connects the preshaping means to another input of the second adder for enabling an algebraic combination of the given signal with a concurrently arriving feed-forward pulse derived by the first threshold unit and the filter from the subsequent incoming signal. A second threshold unit is connected to the second adder for converting an output pulse thereof into a second decided pulse. The preshaping means includes circuitry for reducing the amplitude of each incoming signal from a peak at an instant $t(0)$ to at least near-zero at an instant $t(0)+T$, the period $T$ equaling a sampling interval.

In a system for receiving incoming digital signals from a transmission path, according to yet another feature of my present invention, an equalizer includes means for sampling the incoming signals at successive instants separated by the aforementioned predetermined period $T$, a threshold unit for converting a given signal sample into a decided pulse having one of several predetermined levels, and a filter for feeding back a corrective signal from an output of the threshold unit to an input thereof. A preshaping means inserted between the transmission path and the equalizer reduces the amplitude of each incoming signal from a peak at an instant $t(0)$ to at least near-zero at an instant $t(0)+T$ and re-establishes at an instant $t(0)+2T$ a finite amplitude of the same polarity as the peak at $t(0)$. The preshaping means includes pulse-generating circuitry provided with weighting networks and retarding means for producing at least one countersignal delayed with reference to the original incoming signal, and an adder for superimposing the countersignal upon the original signal.

BRIEF DESCRIPTION OF THE DRAWING

These and other features of my present invention will not be described in detail, reference being made to the accompanying drawing in which.

SPECIFIC DESCRIPTION

Figures 1, 2:
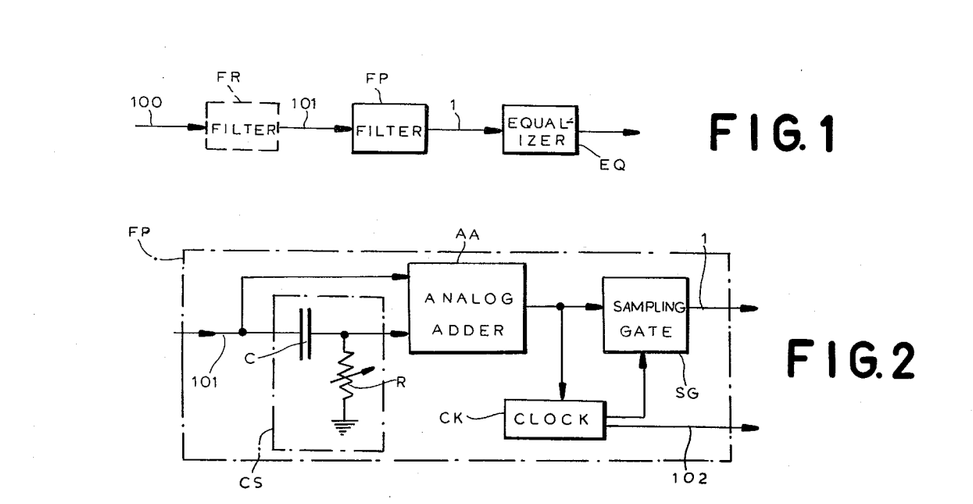
FIG. 1 is a block diagram of an equalization system according to my present invention, showing an equalizer connected to a preshaping filter.
FIG. 2 is a block diagram of the preshaping filter shown in FIG. 1.

As illustrated in FIG. 1, a system for eliminating the effects of postcursor and precursor interference from an incoming train of digital signals comprises a preshaping filter FP connected at an input to the receiving end 101 of a transmission path 100 and at an output to an equalizer EQ via a lead 1. As shown in FIG. 2, filter FP includes an analog adder AA receiving the train of digital pulses arriving on lead 101. A compensation-signal generator CS formed as a differentiating circuit has a capacitor C connected at one end to transmission lead 101 and at another end to a grounded variable resistor R and analog adder AA. Adder AA works into a sampling gate SG and into a timing circuit or clock CK. This clock feeds to gate SG pulses extracted from the signal output of adder AA and having a recurrence period $T$, clock CK also emitting timing pulses on a lead 102 for controlling evaluation operations in decision stages of equalizer EQ, as described in detail hereinafter. The reciprocal of transmission period $T$ is the rate at which signals arrive over transmission path 100.

Figure 3:
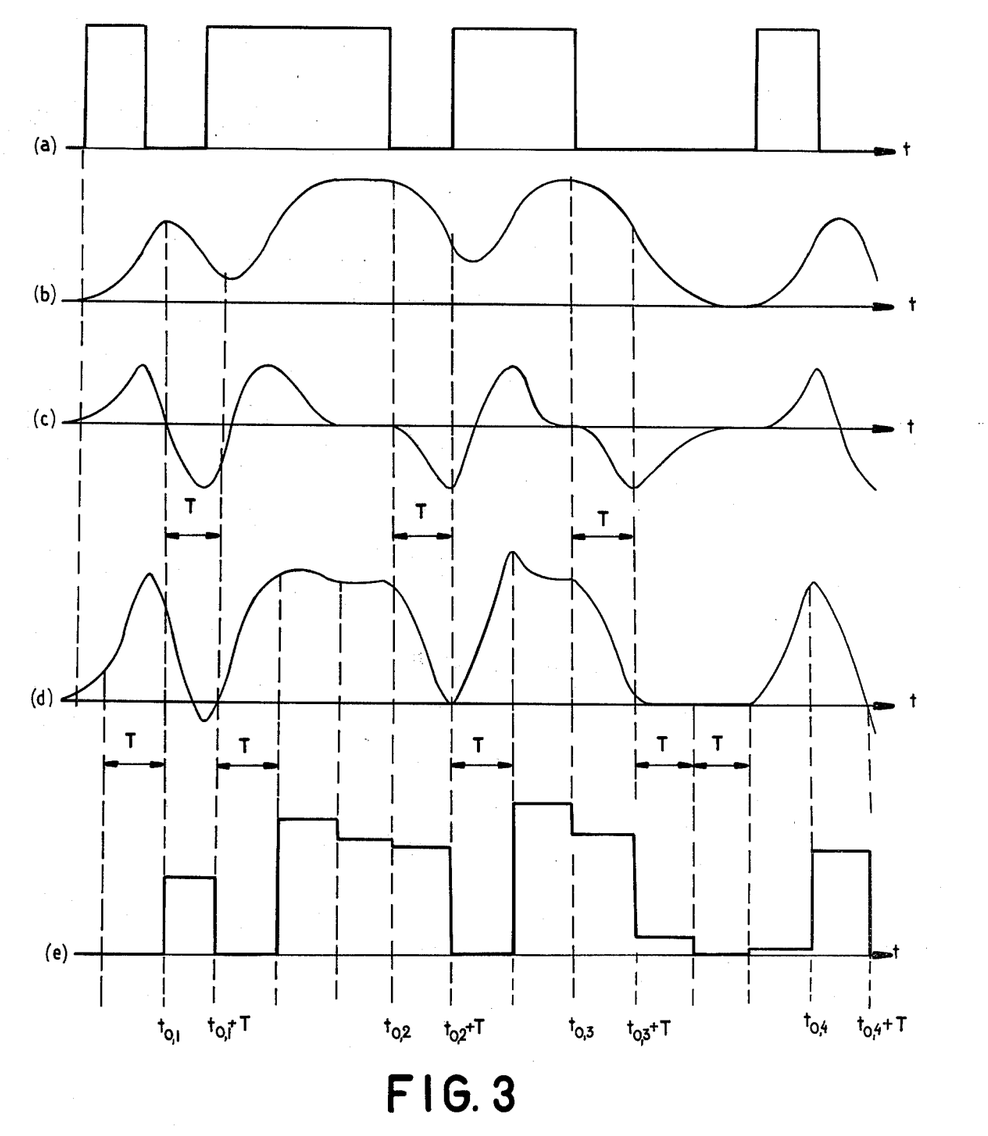
FIG. 3 is a set of graphs showing signals generated by the filter of FIGS. 1 and 2 in response to an arbitrarily selected input signal.

The operation of filter FP will now be described with reference to the graphs of FIG. 3. Let us assume that a train of digital pulses shown in graph (a) is generated on path 100 at a transmitting station (not shown) remote from the receiving system shown in FIG. 1. Owing to the non-ideal transmission characteristics of path 100, each signal carried thereon becomes associated with preceding undershoots and with tails, also known as precursors and postcursors, respectively. The signal train arriving at filter FP consequently has a shape in which intersymbol interference has increased the voltage of 0-level signals and rounded the edges of pulses having a high logic level, as illustrated by graph (b). Differentiator CS and analog adder AA both receive the signal of graph (b), unit CS generator a compensation signal shown in graph (c). This compensation signal is a weighted derivative of the degenerate pulse train of graph (b), the amplitude of the derivative signal being controlled by adjusting the resistor R (FIG. 2). The compensation signal of graph (c) is fed to adder AA together with the arriving signal train; adder AA algebraically combines the two signals to produce an output signal shown in graph (d). This output signal is transmitted to gate SG which samples that signal at times determined by the clock pulses generated by timer CK, a stepwise voltage emitted on lead 1 having during each sampling period a d-c voltage level proportional to the instantaneous magnitude of the output signal of adder AA at the beginning of the sampling period. Graph (e) shows the signal generated by sampling gate SG upon receiving the signal shown in graph (d). As illustrated in grapsh (b) and (d) of FIG. 3, an input signal to adder AA having clusters of 1-level pulses with respective maximum voltage levels commencing to decline at times $t_{0,1}$, $t_{0,2}$, $t_{0,3}$ is altered by adder AA in accordance with the weighted derivative from compensation signal generator CS to form a signal, graph (d), having near-zero logic levels at times $t_{0,1}+T$, $t_{0,2}+T$, $t_{0,3}+T$.

It is known that the insertion of a filter upstream of an equalizer can increase the noise in an arriving signal. In order to avoid signal deterioration negatively counterbalancing the compensatory action of filter FP, a further filter FR may be inserted in transmission path 100 upstream of filter FP, as illustrated in FIG. 1. Filter FR may be a conventional filter reducing the bandwidth of the transmitted signal train. Such a reduction may increase the distortion of the pulses, but this distortion can be easily compensated by the action of filter FP and equalizer EQ.

Figure 4:
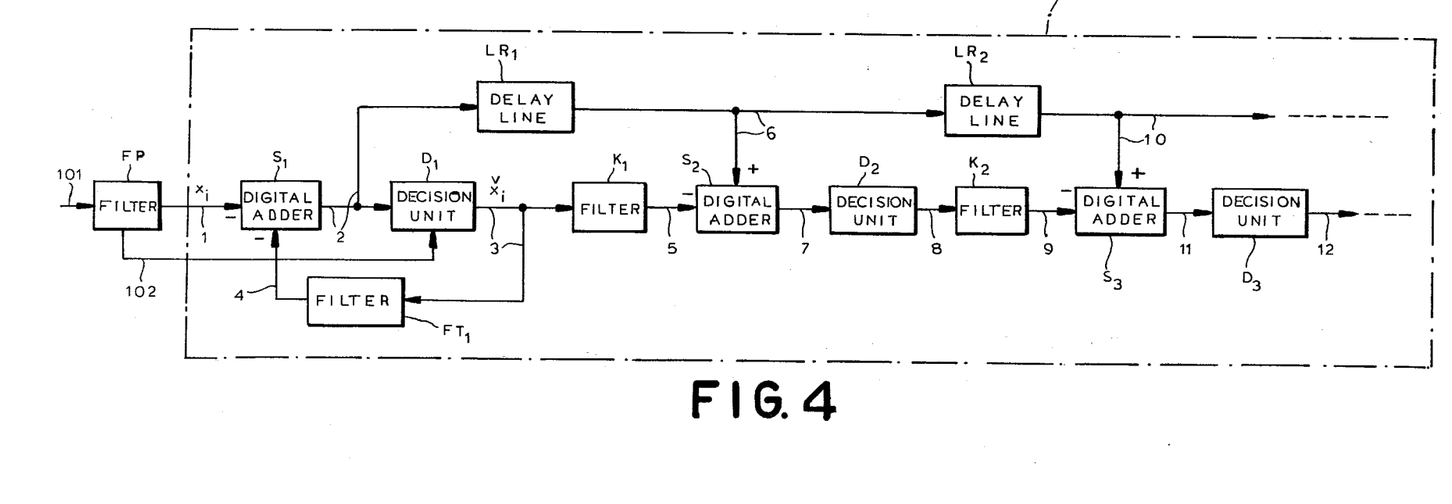
FIG. 4 is a block diagram of the equalizer shown in FIG. 1.

As illustrated in FIG. 4, leads 1, 102 may extend to a conventional two-input, one-output digital adder $S_1$ and to a threshold decision unit $D_1$, respectively, adder $S_1$ and unit $D_1$ forming portions of equalizer EQ. As heretofore described, lead 1 carries digital signals containing information symbols $x_1$ having recurrence period T. Adder $S_1$ is connected via a lead 4 at a second input to a filter $FT_1$ via a leas 2 at an output to decision unit $D_1$ which is controlled by clock pulses from timer CK (FIG. 1) to emit on an output lead 3 decided symbols $\check{x}_i$ in response to pulses arriving from adder $S_1$ over lead 2. Lead 3 works into filter $FT_1$ which generates, on the basis of decided symbols $\check{x}_i$ and channel characteristics, signal fed back to adder $S_1$ for correcting interfering postcursor samples. Adder $S_1$, decision unit $D_1$ and filter $FT_1$ constitute a nonlinear equalizer with decision feedback, well known to the skilled in the art; symbol $\check{x}_i$ is a pulse having one of several predetermined signal levels as is well known per se.

Adder $S_1$ substracts from the signal arriving over lead 1 the signal from filter $FT_1$ compensating at least in part postcursor interference and transmits the resulting signal to decision unit $D_1$ and to a delay line $LR_1$ serving to retard incoming pulses by the intersymbol period T. Delay line $LR_1$ has an output lead 6 extending to a second delay line $LR_2$ and to another two-input and one-output digital adder $S_2$ also receiving input signals from a filter $K_1$ via a lead 5, this filter generating the values of interfering precursor samples in response to decided symbols $x_i$ received from decision unit $D_1$ over lead 3 and in accordance with predetermined channel characteristics. The complexity of filter $K_1$, e.g. the number of cells if it has a transversal structure, will depend on the number of interfering samples associated with each pulse, i.e. on the transmission rate; in cases in which pulses present only one interfering precursor sample, filter $K_1$ is reduced to a simple multiplier.

Adder $S_2$ subtracts a precursor value estimated by filter $K_1$ from the signal delayed by line $LR_1$ and transmits over a lead 7 to another decision unit $D_2$ a signal at least partially purged of precursor and postcursor interference. In accordance with predetermined threshold levels, decision unit $D_2$ generates decided pulses on a lead 8 working into a filter $K_2$. Filter $K_2$ is tied by means of a lead 9 to a two-input, one-output digital adder $S_3$ in turn connected at a second input to delay line $LR_2$ via a lead 10 and at an output to another conventional threshold decision unit $D_3$ via a lead 11. Filter $K_2$, delay line $LR_2$, adder $S_3$ and decision unit $D_3$ have the same structures and perform the same functions as units $K_1$, $LR_1$, $S_2$ and $D_2$, respectively. The equalization network or cell formed by filter $K_2$, delay line $LR_2$, adder $S_3$ and decision unit $D_3$, and further equalization cells having the same structure, compensate for possible decision errors.

In describing the operation of the equalizer shown in FIG. 4, let us assume that at time $t_i$ information symbol $x_i$ is being fed to digital adder $S_1$ and that unit $D_1$ is emitting on lead 3 a decided symbol $x_{i-1}$ generated in response to symbol $\check{x}_{i-1}$ which in turn was present on lead 1 at time $t_1 - T$. Filter $FT_1$ transmits to adder $S_1$ a postcursor-compensation signal which is subtracted in adder $S_1$ from the signal coding the information symbol $x_i$. Also at time $t_i$, delay lines $LR_1$, $LR_2$ feed to digital adders $S_2$, $S_3$ symbols $x_{i-2}$, $x_{i-3}$, respectively. Adder $S_2$ subtracts from the signal coding symbol $x_{i-2}$ the signal received from filter $K_1$ for compensating the precursor interference effects of symbol $x_{i-1}$, while adder $S_3$ purges symbol $x_{i-3}$ of precursor effects due to symbol $x_{i-2}$. It is to be noted that symbols $x_{i-2}$, $x_{i-3}$ have already been substantially cleared of postcursor effects through the action of filter FP, adder $S_1$, decision unit $D_1$ and filter $FT_1$. During the equalization interval beginning at time $t_i + T$ a signal coding the symbol $x_{i+1}$ is fed to digital adder $S_1$ over lead 1, decision unit $D_1$ emitting a signal coding the decided symbol $\check{x}_i$. In response to symbol $\check{x}_i$, filters $FT_1$, $K_1$ deliver to adders $S_1$, $S_2$ postcursor- and precursor-compensation signals, respectively. Adder $S_1$ generates on lead 2 a symbol $x_{i+1}$ having a signal level at least partially cleared of postcursor interference, while adder $S_2$ emits on lead 7 a signal obtained by subtracting a precursor value on lead 5 from a signal on lead 6 coding symbol $x_{i-1}$, this symbol having been purged of at least some postcursor effects during the equalization period beginning at time $t_i$. Digital adder $S_3$ receives a postcursor-purged symbol $x_{i-2}$ from delay line $LR_2$ and a precursor-compensation signal generated by filter $K_2$ in response to a signal level assigned by decision unit $D_2$ to symbol $x_i$.

An advantage of the cascaded equalization network EQ such as that shown in FIG. 4 is that iterative precursor compensation facilities the correction of possible errors in the decisions taken by units $D_1$ and $D_2$. For example, an error made by decision unit $D_1$ will result in errors by filters $FT_1$, $K_1$. However, an incorrect precursor value emitted from filter $K_1$ is combined in adder $S_2$ with a signal whose value has not been affected by the error of decision unit $D_1$, thereby decreasing the probability that the error made by the first decision unit $D_1$ will be repeated by the second decision unit $D_2$. The utilization of a plurality of cascaded equalization cells in equalizer EQ (FIG. 2) is particularly advantageous in the case of pulse transmission at rates higher than Nyquist's rate; at such rates secondary precursor interference effects, i.e. interference effects on symbol $x_i$ due to precursors of symbol $x_{i+2}$, become negligible upon passage through a small number of cells.

Figure 5:
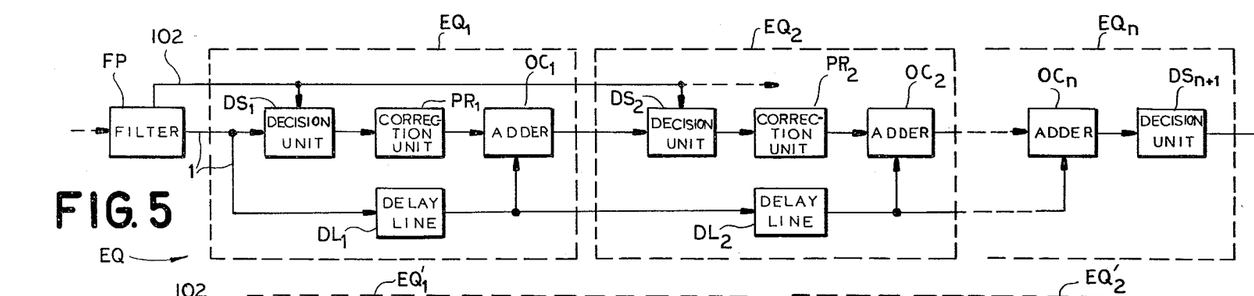
FIGS. 5-8 are block diagrams showing alternative embodiments of the equalizer of FIGS. 1 and 4.

As illustrated in FIG. 5, equalizer EQ may comprise a cascaded chain of equalization cells $EQ_1$, $EQ_2$, ... $EQ_n$ each including a decision unit $DS_1$, $DS_2$, ... $DS_n$ evaluating incoming pulse trains under the control of clock pulses received from timer CK over lead 102 and feeding the resulting decided pulse trains to correction stages $PR_1$, $PR_2$, ... $PR_n$ in turn working into two-input, one-output algebraic adders $OC_1$, $OC_2$, ... $OC_n$. Adders $OC_1$–$OC_{n-1}$ are tied to the decision units $DS_2$–$DS_n$ of the succeeding equalization cells $EQ_2$–$EQ_n$ and receive additional input signals from a cascade of delay lines $DL_1$–$DL_n$.

The first decision unit $DS_1$ and the first delay line $DL_1$ are connected at respective inputs to lead 1 extending from preshaping filter FP (see FIG. 1), while the final adder $OC_n$ feeds an additional decision unit $DS_{n+1}$.

Decision units $DS_1$–$DS_{n+1}$ may be devices evaluating a sequence of digital signals arriving on lead 1. In particular, units $DS_1$–$DS_{n+1}$ may be Viterbi receivers, devices evaluating digital signal trains according to the Viterbi algorithm, as described by G. D. Forney in the paper "The Viterbi Algorithm", *Proceedings of the*

*IEEE*, vol. 61, No. 3, March 1973. If decision unit $DS_1$ is formed as a Veiterbi receiver, correction stage $PR_1$ receives pulse sequences at least partially purged of distortions due to postcursors and feeds to adder $OC_1$, in response to such partially postcursor-purged pulse sequences, signals compensating precursor interference effects. These compensation signals are algebraically combined in adder $OC_1$ with the train of digital pulses arriving from lead 1 via delay line $DL_1$, this line delaying incoming pulses by the time taken for the operations of Viterbi decusion unit $DS_1$ and the precursor-compensation-signal generator $PR_1$. Adder $OC_1$ transmits to decision unit $DS_2$ a sequence of pulses at least partially cleared of both postcursor and precursor interference effects. Because sequence evaluation in equalization cell $EQ_2$ occurs in response to a sequence already partially corrected in equalization cell $EQ_1$, the probability of error in sequence evaluation and precursor determination is reduced with respect to the first cell $EQ_1$; consequently, the corrections implemented by unit $OC_2$ on a distorted sequence delayed by lines $DL_1$, $DL_2$ will be more effective than the corrections implemented by unit $OC_1$. Error is further reduced by the equalization cells $EQ_3$–$EQ_n$ downstream of cells $EQ_1$ and $EQ_2$. Decision unit $DS_{n+1}$ at the output of the equalizaer cascade $EQ_1$–$EQ_n$ evaluated a pulse sequence in which precursor effects have been entirely removed and emits a sequence also substantially devoid of postcursor interference effects.

As heretofore described with reference to FIGS. 1 3, filter FP preshapes a pulse train arriving over transmission channel 100, reducing the postcursors of a cluster of pulses all having logic level "1". Filter FP thus facilitates the action of equalization cells $EQ_1$–$EQ_2$. However, because a Viterbi receiver acting as decision unit $DS_1$ takes postcursor interference effects into account in deciding a sequence of pulses, the advantage of filter FP is not as great as in the equalization system shown in FIG. 1.

Correction stages $PR_1$–$PR_n$ (FIG. 5) may determine postcursor values as well as precursor values, such devices being known in the art as channel simulators. Postcursor- and precursor-compensation signals emitted by units $PR_1$–$PR_n$ are subtracted in adders $OC_1$–$OC_n$ from pulse sequences arriving over delay lines $DL_1$–$DL_n$. The utilization of channel simulators for correction stages $PR_1$–$PR_n$ facilitates the operation of decision units $DS_2$–$DS_{n+1}$, propitiously reducing error probabilities and decreasing the number n of necessary equalization cells $EQ_1$–$EQ_n$.

As an alternative to making decisions on entire pulse sequences, units $DS_1$–$DS_{n+1}$ may be devices using a whole input sequence for making decisions on single pulses. Such a device may comprise an Ungerboeck receiver operating according to the principle described by Gottfried Ungerboeck in the paper "Nonlinear Equalization of Binary Signals in Gaussian Noise", *IEEE Transactions on Communications Technology*, vol. COM-19, No. 6, December 1971.

Figure 6:
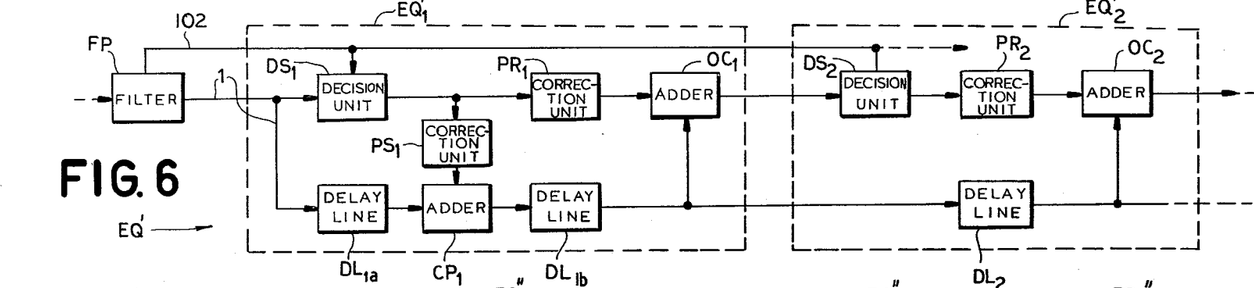

In FIG. 6 I have illustrated an equalizer EQ' in which postcursor compensation if effectively completed in a first equalization cell EQ'. Decision unit $DS_1$ of equalization cell EQ' feeds, in addition to correction stage $PR_1$, another correction unit $PS_1$ in turn connected at an output to an adder $CP_1$. Correction unit $PS_1$ emits postcursor-compensation signals to adder $CP_1$ which subtracts these signals from pulse trains received from filter FP over lead 1 and a delay line $DL_{1a}$, this line delaying incoming signals by the time required for the operations of decision unit $DS_1$ and correction unit $PS_1$. Adder $CP_1$ transmits to a delay line $DL_{1b}$ trains of digital pulses substantially purged of postcursor interference effects; these digital pulse trains are conducted at the output of delay line $DL_{1b}$ to adder $OC_1$ for algebraic combination with precursor signal levels generated by unit $PR_1$. Thus delay line $DL_2$ and decision unit $DS_2$ of equalization cell $EQ_2$ receive from delay line $DL_{1b}$ and adder $OC_1$ of equalization cell $EQ_1'$ generally precursor-free signals, whereby the decision operations of unit $DS_2$ and of subsequent decision unit $DS_3$–$DS_{n+1}$ (FIG. 5) in the equalization-cell cascade $EQ_1'$, $EQ_2$–$EQ_n$ are facilitated. As heretofore described with reference to FIG. 5, decision units $DS_1$–$DS_{n+1}$ may be realized by devices such as Viterbi receivers precursively estimating the state sequence of a discrete-time finite-state Markov process or Ungerboeck receivers each consisting of a matched filter followed by a complex nonlinear transversal filter, as derived by maximized a posteriori probability.

Figure 7:
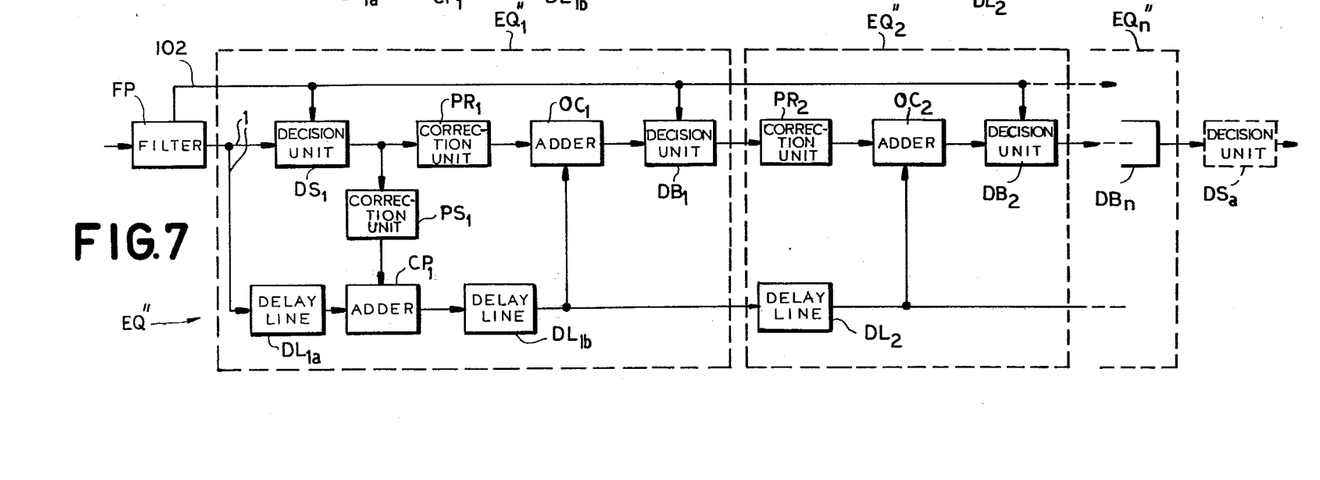

In FIG. 7 I have shown an equalizer EQ" in which only unit $DS_1$ in a first equalization cell $EQ_1''$ makes decisions on the basis of an entire incoming pulse sequence, this decision unit taking the form of either a Viterbi receiver or an Ungerboeck receiver. Further decision units $DB_1$, $DB_2$, ... $DB_n$ connected in cascade with unit $DS_1$ are conventional threshold devices making decisions pulse by pulse. As heretofore described with respect to FIG. 6, decision unit $DS_1$ is tied at its output to correction stages $PR_1$ and $PS_1$ respectively transmitting precursor- and postcursor-compensation signals to respective adders $OC_1$ and $CP_1$. Adder $OC_1$ subtracts the precursor-compensation signal from the postcursor-compensated digital pulse train arriving from adder $CP_1$ over delay line $DL_{1b}$ and transmits the resulting pulse sequence to threshold unit $DB_1$. Decision units $DS_1$, $DB_1$, $DB_2$, ... $DB_n$ are all tied to timer CK (FIG. 2) via lead 102 for evaluating pulse levels at discrete intervals determined by timer CK. At the output of the equalizer cascade $EQ_1''$–$EQ_n''$ I provide an additional decision unit $DS_a$ formed as a device operating on signal sequences, such as a Viterbi or Ungerboeck receiver, unit $DS_a$ being advantageously followed by another chain of equalization cells (not shown).

It is to be noted that, in the case of short consecutive pulse sequences wherein the postcursors of one sequence affect the initial pulses of a following sequence, it will be useful to feed the output of correction unit $PS_1$ (FIGS. 6 and 7) back to an input of decision unit $DS_1$, despite the fact that such feedback will produce increased circuit complexity due at least in part to further required delay lines. It is also to be noted, as heretofore described with respect to FIG. 4, that increasing the number n of equalization cells $EQ_1''$–$EQ_n''$ will increase the probability that errors introduced early in the equalization process, e.g. by decision unit $DB_1$, will be eliminated by the end of the process.

Figure 8:
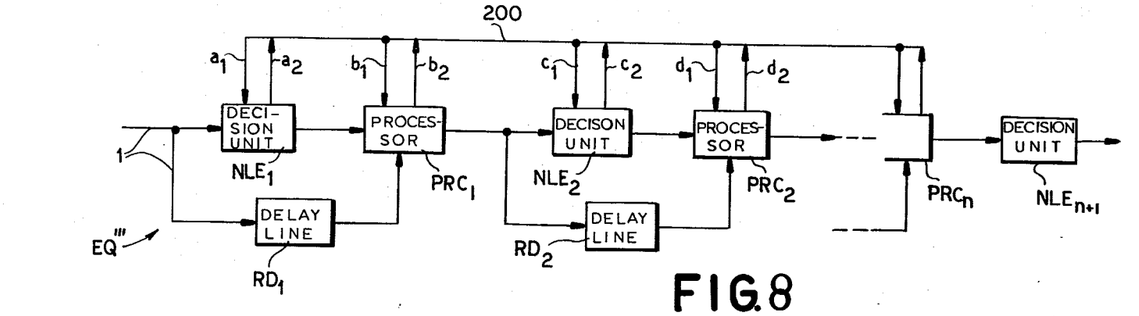

In FIG. 8 I have shown an equalization system EQ''' comprising cascaded nonlinear decision devices $NLE_1$, $NLE_2$, ... $NLE_{n+1}$ interleaved with a plurality of processors $PRC_1$, $PRC_2$, ... $PRC_n$ functioning as correction units reducing the degree of intersymbol interference in incoming pulse trains. Decision units $NLE_1$–$NLE_{n+1}$ may decide entire pulse sequences or single pulses either individually or on the basis of whole pulse trains, i.e. each unit $NLE_1$–$NLE_{n+1}$ may take the form of a Viterbi receiver, a conventional threshold decision device or an Ungerboeck receiver. It will be advantageous to select units $NLE_1-NLE_{n+1}$ to provide protection against all possible types of interference: units $NLE_1-NLE_{n+1}$ will advantageously include Viterbi and Ungerboeck receivers and conventional threshold devices.

As further shown in FIG. 8, decision units $NLE_1-NLE_n$ are connected to processors $PRC_1-PRC_n$ in parallel with respective delay lines $RD_1$, $RD_2$, ... $RD_n$ which delay input signals by the time required for operations in the respective decision units $NLE_1-NLE_{n+1}$. Decision units $NLE_1-NLE_n$ and processors $PRC_1-PRC_n$ communicate with one another by means of a bidirectional multiple 200, input leads $a_1$, $b_1$, $c_1$, $d_1$, ... and output leads $a_2$, $b_2$, $c_2$, $d_2$, .... Information exchange will generally be between adjacent devices in the equalization-system chain, such information arising at least in part from the detection of redundancies and intersymbol interferences in pulse sequences already partially corrected.

Figure 9:
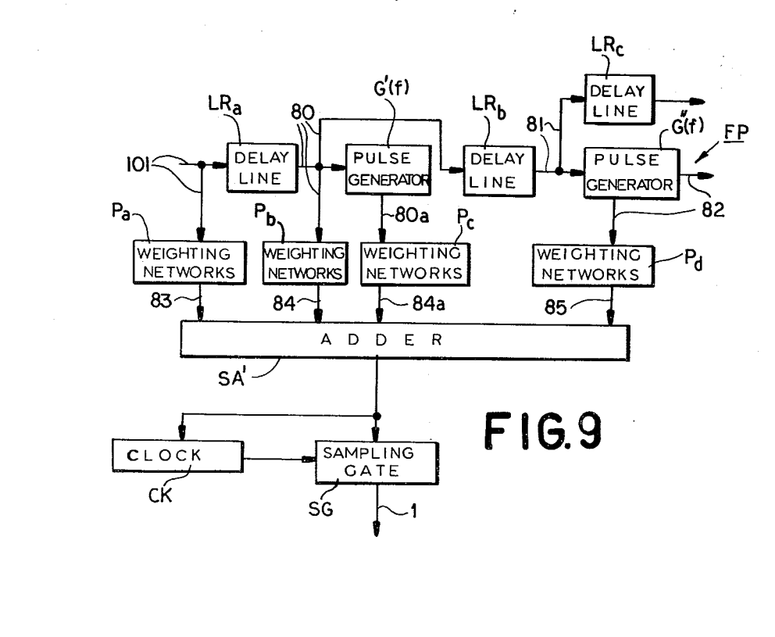
FIG. 9 is a block diagram showing an alternative embodiment of the preshaping filter of FIGS. 1 and 2.

As illustrated in FIG. 9, preshaping filter FP may alternatively comprise a plurality of weighting networks $P_a$, $P_b$, $P_c$, $P_d$ working via respective leads 83, 84, 84a, 85 into a multiple-input, one-output analog adder SA' which in turn is connected to sampling gate SG and clock CK, as heretofore described with respect to the analog adder AA of FIG. 2. Weighting networks $P_a$ are tied at an input to transmission lead 101 which is also connected to a delay line $LR_a$ having an output lead 80 extending to weighting networks $P_b$, to a pulse generator G'(f) and to another delay line $LR_b$. Pulse generator G'(f) works into weighting networks $P_c$ via a lead 80a, while delay line $LR_b$ has an output lead 81 extending to yet another delay line $LR_c$ and to another pulse generator G''(f) with an output lead 82 connected to weighting networks $P_d$.

Figure 10:
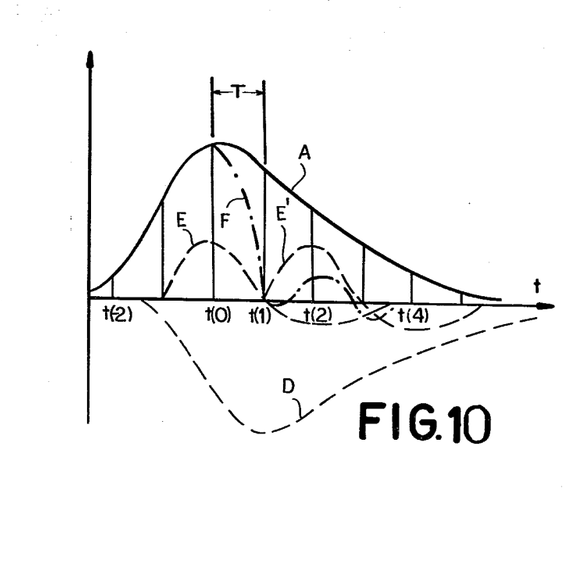
FIG. 10 is a graph showing signals generated by the filter of FIG. 9 in response to an incoming pulse.

It will now be convenient to refer to FIG. 10 in describing the operation of the preshaping filter FP shown in FIG. 9. A signal A arriving over transmission-channel end section 101 with a precursor and a postcursor extending its duration beyond several sampling periods T is conducted to adder SA' via weighting networks $P_a$ and via delay line $LR_a$ and weighting networks $P_b$. A signal D fed to adder SA' from weighting networks $P_b$ over lead 84 is proportional in magnitude to signal A transmitted on lead 83 from networks $P_a$ but is delayed and inverted with respect to this signal. Signal A is fed at the output of delay line $LR_a$ to pulse generator G'(f) for differentiation thereby and amplification by weighting networks $P_c$ to form a derived signal E transmitted to adder SA' over lead 84a. Another signal E' similar to signal E but delayed further owing to delay line $LR_b$ is produced by generator G''(f) and weighting networks $P_d$ on lead 85. Signals A, D, E, E' are algebraically combined in adder SA' to form a composite output signal F having a peak amplitude at an instant t(0) and an amplitude reduced to a near-zero value at an instant $t(1)=t(0)+T$, where T is a predetermined period between successive samples taken by gate SG (see FIG. 9). At an instant $t(2)=t(0)+2T$ the output signal F has re-established a finite amplitude of the same polarity as the peak at instant t(0).

I claim:

1. An equalization system for eliminating the effects of postcursor and and precursor interference from a train of incoming signals in the form of digital pulses, comprising:

a transmission path with a receiving end carrying said incoming signals, the latter having a recurrence period T;

timing means connected to said receiving end for extracting said recurrence period T and establishing a succession of discrete intervals T related thereto;

pulse-shaping means connected to said receiving end and controlled by said timing means for deriving from said incoming signals a compensating wave whose absolute amplitude at instants $t_0+T$ substantially equals that of said incoming signals, $t_0$ being the instants at which said digital pulses reach their peak amplitudes, said pulse shaping means including circuitry for subtractively combining said incoming signals with said compensating wave to produce a resulting pulse train with amplitudes close to zero at said instants $T_0+T$;

an equalizer with a cascade of decision stages and interleaved algebraic adders connected to said pulse-shaping means for receiving said resulting pulse train therefrom, at least the first one of said decision stages being controlled by said timing means to evaluate samples of said pulse train at said discrete intervals, each of said decision stages being followed by a respective correction stage feeding an interference-compensating signal to the immediately following algebraic adder; and cascaded delay means connected between said pulse-shaping means and said algebraic adders for supplying the latter with differently delayed samples of said pulse train taken at staggered periods corresponding to the operating times of the respective decision and correction stages.

2. An equalization system as defined in claim 1 wherein said decision stages include at least one device for deciding entire pulse sequences.

3. An equalization system as defined in claim 2 wherein said device is a Viterbi receiver.

4. An equalization system as defined in claim 1 wherein said decision stages include at least one device for deciding individual pulses on the basis of an entire incoming pulse sequence.

5. An equalization system as defined in claim 4 wherein said device is an Ungerboeck receiver.

6. An equalization system as defined in claim 1 wherein said decision stages include threshold means, said equalizer including filter means for feeding back a corrective signal from an output of said threshold means to an input thereof.

7. An equalization system as defined in claim 1 wherein said pulse-shaping means includes a differentiating circuit for forming said compensating wave.

8. In an equalizer, a method of eliminating the effects of precursor and postcursor interference from a train of incoming digital signals to be sampled at successive instants separated by a predetermined period T, comprising the steps of:

(a) preshaping each incoming signal, having a peak value at instant t(0), with reduction of its amplitude to a value close to a zero at instant $t(0)+T$;

(b) transmitting the preshaped signal to a first decision stage of said equalizer;

(c) deriving from the output of said first decision stage a feed-forward pulse adapted to compensate for precursor interference with a succeeding signal;

(d) delaying the purged signal from step (b) by a time sufficient to let the delayed signal coincide with the feed-forward pulse derived in step (c);

(e) algebraically combining the feed-forward pulse from step (c) with the delayed signal from step (d) to produce a resulting signal; and (f) transmitting the resulting signal from step (e) to a second decision stage of said equalizer to produce a decided signal.

9. A method as defined in claim 8, further comprising the step of algebraically combining the preshaped signal of step (a), prior to transmission to said first decision stage, with a feedback pulse derived from the output of said first decision stage to produce a corrected signal purged from postcursor interference due to a preceding signal.

10. A method as defined in claim 8 wherein each incoming signal is preshaped by algebraically combining same with a weighted derivative thereof.

11. In a system for receiving incoming digital signals from a transmissiom path, in combination:

an equalizer including means for sampling the incoming signals at successive instants separated by a predetermined period T, threshold means for converting a given signal sample into a decided pulse having one of several predetermined levels, and filter means for feeding back a corrective signal from an output of said threshold means to an input thereof; and preshaping means inserted between said transmission path and said equalizer for reducing the amplitude of each incoming signal from a peak at an instant $t(0)$ to at least near-zero at an instant $t(0)+T$ and re-establishing at an instant $t(0)+2T$ a finite amplitude of the same polarity as said peak, said preshaping means including pulse-generating circuitry provided with weighting and retarding means for producing at least one countersignal delayed with reference to the original incoming signal, and adding means for superimposing said countersignal upon said original signal.

12. An equalizer for eliminating the effects of postcursor and precursor interference from a train of incoming digital signals, comprising:

preshaping means connected to a transmission path carrying said incoming signals;

first threshold means connected to said preshaping means for converting a given incoming signal, sampled at uniform intervals, into a first decided pulse having one of several predetermined signal levels;

filter means connected to said first threshold means for deriving from said first decided pulse a feedback pulse adapted to correct postcursor interference and a feed-forward pulse adapted to compensate for precursor interference;

first summing means inserted between said preshaping means and said first threshold means, said first summing means being connected to said filter means for algebraically combining said feedback pulse with a subsequent incoming signal;

second summing means having an input connected to said filter means for receiving said feed-forward pulse therefrom;

delay means connecting said preshaping means to another input of said second summing means for enabling an algebraic combination of said given signal with a concurrently arriving feed-forward pulse derived by said first threshold means and said filter means form said subsequent signal; and second threshold means connected to said second summing means for converting an output pulse of the latter into a second decided pulse;

said preshaping means including circuitry for reducing the amplitude of each incoming signal from a peak at an instant $t(0)$ to at least near-zero at an instant $t(0)+Tm$ T being a sampling interval.

13. An equalization system for eliminating the effects of postcursor and precursor interference from a train of incoming signals in the form of digital pulses, comprising:

a transmission path with a receiving end carrying said incoming signals, the latter having a recurrence period T;

timing means connected to said receiving end for extracting said recurrence period T and establishing a succession of discrete intervals T related thereto;

pulse-shaping means connected to said receiving end and controlled by said timing means for deriving from said incoming signals a compensating wave whose absolute amplitude at instants $t_0+T$ substantially equals that of incoming signals, $t_0$ being the instants at which said digital pulses reach their peak amplitudes, said pulse-shaping means including circuitry for subtractively combining said incoming signals with said compensating wave to produce a resulting pulse train with amplitudes close to zero at said instants $t_0+T$;

an equalizer with a cascade of nonlinear decision stages and interleaved processing stages, for the correction of intersymbol interference, the first decision stage of said equalizer being connected to said pulse-shaping means for receiving said resulting pulse train therefrom; and cascaded delay means connected between said pulse-shaping means and said processing stages for supplying the latter with differently delayed samples of said pulse train taken at staggered periods corresponding to the operating times of the respective decision and processing stages.

14. A system as defined in claim 13 wherein at least one of said decision stages is a Viterbi receiver.

15. A system as defined in claim 13 wherein at least one of said decision stages is an Ungerboeck receiver.

16. A system as defined in claim 13 wherein at least one of said decision stages is a threshold device.

* * * * *